(12) United States Patent
Murakami et al.

(10) Patent No.: US 6,699,335 B2
(45) Date of Patent: Mar. 2, 2004

(54) MACHINE PART

(75) Inventors: Yukitaka Murakami, 6-20-7, Miwadai, Higashi-ku, Fukuoka-shi, Fukuoka (JP), 811-0212; Yasuo Murakami, Hadano (JP)

(73) Assignees: NSK Ltd., Tokyo (JP); Yukitaka Murakami, Fukuoka (JP)

( * ) Notice: Subject to any disclaimer, the term of this patent is extended or adjusted under 35 U.S.C. 154(b) by 0 days.

(21) Appl. No.: 10/203,814
(22) PCT Filed: Nov. 14, 2001
(86) PCT No.: PCT/JP01/09946
§ 371 (c)(1), (2), (4) Date: Aug. 14, 2002
(87) PCT Pub. No.: WO02/40730
PCT Pub. Date: May 23, 2002

(65) Prior Publication Data
US 2003/0089428 A1 May 15, 2003

(30) Foreign Application Priority Data
Nov. 15, 2000 (JP) ........................ 2000-347676

(51) Int. Cl.$^7$ .............................. C22C 38/00
(52) U.S. Cl. .................. 148/320; 148/321; 420/8; 420/9
(58) Field of Search ............ 148/320, 321; 420/8, 9

(56) References Cited

U.S. PATENT DOCUMENTS 6,095,692 A * 8/2000 Takemura .................. 384/492

FOREIGN PATENT DOCUMENTS

| JP | 01087746 | 3/1989 |
| JP | 07278758 | 10/1995 |
| JP | 08061372 | 3/1996 |
| JP | 10001746 | 1/1998 |
| JP | 10110247 | 4/1998 |
| JP | 11131154 | 5/1999 |
| JP | 11256274 | 9/1999 |

OTHER PUBLICATIONS

Yukitaka Murakami, et al., "Effect of Hydrogen Trapped by Inclusions on Ultralong Fatigue Failure of Bearing Steel" Proceedings of the 25$^{th}$ Symposium on Fatigue, Oct. 13, 2000.

Takeshi Naito, et al., "Observation of Fatigue Fracture Surface of Carburized Steel" Materials, vol. 32, No. 361, 1983 (no month data).

Hideki Emura, et al., "Fatigue Strength Characteristics of High Strength Steel" Kiron, vol. 55, No. 509, 1989 (no month data).

Yukitaka Murakami, et al., "Analysis of the Mechanism of Superlong Fatigue Failure by Optical Microscope and AFM/SEM Observations" The Society of Materials Science, Japan 24$^{th}$ Fatigue Symposium Proceedngs, 1998 (no month data).

Yukitaka Murakami, et al., "Analysis of the Mechanism of Superlong Fatigue Failure by Optical Microscope and AFM/SEM Obeservations" Materials, vol. 48, No. 10, 1999 (no month data).

(List continued on next page.)

Primary Examiner—John Sheehan
Assistant Examiner—Andrew L. Oltmans
(74) Attorney, Agent, or Firm—Crowell & Moring LLP

(57) ABSTRACT

Machine part is constituted with steel with the carbon content of 0.2% or more and reduced with the hydrogen content after hardening by a heat treatment to 0.04 ppm or less. Further, hardness after hardening by the heat treatment is made to Hv 450 or more. Since such a machine part is excellent in the super long life fatigue characteristics, it can be used suitably as a bearing ring or a rolling element of a rolling bearing.

3 Claims, 4 Drawing Sheets

OTHER PUBLICATIONS

Yukitaka Murakami, et al., Mechanism of Superlong Fatigue Failure in the Regime of N 10$^7$ Cycles and Fractography of the Fracture Surface, Kiron, vol. 66, No. 642, 2000 (no month data).

Yukitaka Murakami, et al., "Effect of Hydrogen Trapped by Inclusions on Ultralong Fatigue Failure of Bearing Steel" The Society of Materials Science, Japan, Proceedings of the 25$^{th}$ Symposium on Fatigue, Nov. 21–22, 2000.

* cited by examiner

SEM observation at dark area (SCM435), $\sigma = 560\text{MPa}, N_f = 2.17 \times 10^8$ Unit(mm)

MACHINE PART

TECHNICAL FIELD

This invention relates to a machine part of excellent super long life fatigue characteristics and, more in particular, it relates to a machine part used suitably for those portions undergoing repetitive high stresses (such as bending, tension and compression), for example, axles of vehicles such as bullet trains, gears, blades of turbines, reduction gears such as of automobiles and industrial machines, and bearings.

BACKGROUND ART

Heretofore, when fatigue fractures by repetitive stresses (such as the bending stresses, tensile stresses and compressive stresses) do not occur over the number of repetitive cycles N of $10^7$ on metal materials such as high strength steels, it is considered that the fatigue fractures do not occur thereafter. Therefore, fatigue limits (the fatigue strength) are determined at the number of repetitive cycles: $N=10^7$ cycles.

In recent years, however, a phenomenon that fatigue fractures do not occur up to $10^7$ cycles but fatigue fractures occur in excess of number of repetitive cycles N of $10^7$ (the phenomenon is referred hereinafter as super long life fatigue fracture and the fatigue characteristic the number of at repetitive cycles : $N=10^7$ over is referred to as super long life fatigue characteristic) was reported by Naito, et al (Materials, 32, 361 (1983)) and Emura, et al (KIRON A-55, 509 (1989)), which has now attracted attention.

Since machine parts, for example, axles of vehicles such as bullet trains and blades of turbine are sometimes used under repetitive stresses in excess of $10^7$ cycles, it is important to analyze the cause for the occurrence of the super long life fatigue fracture.

On the other hand, adverse effects of hydrogen on the static strength of high strength steels are well known as the phenomena such as delayed fracture. However, the effects of hydrogen have been pointed out as factors to reduce the fatigue characteristics of high strength steels, for the first time, by Murakami, et al only recently (The Society of Materials Science, Japan 24th Fatigue Symposium Proceedings (1998), and Materials, 48.10 (1999)).

As the method for preventing the deterioration of delayed fracture characteristic there are disclosed, for example, a method of trapping hydrogen intruding in steels thereby restricting the number of sulfide compounds and inclusions that form concentration sources of hydrogen (Japanese Published Unexamined Patent Application No. 1746/1998) or a method of dispersing and precipitating fine carbides, nitrides, sulfides in steels to trap intruded hydrogen in a dispersed manner thereby suppressing hydrogen embrittlement (Japanese Published Unexamined Patent Application No. 110247/1998). Such examples concern mainly for steel materials used in applications where a relatively great amount of hydrogen may possibly intrude from the surface of the steel materials (diffusive hydrogen) during use.

Also, Japanese Published Unexamined Patent Application No. 256274/1999 discloses high strength fine steel wires intended for the improvement of delayed fracture characteristic by restricting the amount of hydrogen intruding in the steel such that the amount of hydrogen released upon heating from a room temperature to 300° C. is 0.5 ppm or less.

However, none of the methods disclosed in Japanese Published Unexamined Patent Application No. 1746/1998 and Japanese Published Unexamined Patent Application No. 256274/1999 is intended for the improvement of the super long life fatigue characteristic but for the improvement of usual fatigue characteristic (delayed fracture). Further, they are not based on the data that distinctly analyze the mechanism of hydrogen on the fatigue characteristic. Accordingly, even when the method described above is used, it is difficult to sufficiently improve the super long life fatigue characteristic.

In view of the above, this invention intends to solve the problem in the prior art as described above and has a subject of providing a machine part of excellent super long life fatigue characteristic.

DISCLOSURE OF THE INVENTION

In order to solve the subject described above, this invention comprises the following constitution. That is, the machine part according to this invention is characterized in that it is constituted with steel having a carbon content of 0.2% or more and the hydrogen content after hardening by heat treatment is 0.04 ppm or less.

Further, it is preferred the surface of the machine part is made to hardness of Hv 450 or more by a method, for example, of applying surface hardening treatment.

In accordance with the constitution, the machine part described above has extremely high reliability since there is less possibility of causing undetermined deterioration of fatigue strength due to the effect of hydrogen and the super long life fatigue characteristics are excellent.

Accordingly, the machine part according to this invention can be applied suitably to various machine parts which are used under repetitive stresses of over $10^7$ cycles by rotations or vibrations, such as bearing rings or rolling elements of rolling bearings.

The present inventors have accomplished this invention based on the following findings obtained as a result of extensive studies for the effects of inclusions and hydrogen on the super long life fatigue fracture of high strength steels.

Present inventors have reported that non-metallic inclusions are present at the fracture starting points of steel test specimens suffering from super long life fatigue fracture, and regions appearing more dark under metal microscopic observation because of the rough surface state are present at the periphery of the inclusion (hereinafter referred to as ODA: Optically Dark Area) and hydrogen has an important role to the formation thereof (KIRON A-66, 642 (2000)).

FIG. 1 shows a scanning electron microscopic (SEM) photograph observing inclusions at the fracture starting point, ODA and the vicinity thereof in a test specimen (made of SCM 435) suffering from super long life fatigue fracture. As shown in FIG. 1, while typical fatigue fracture surface is served in the martensitic tissue at the outside of the ODA, the martensitic tissue is not distinctly observed in the ODA and a tissue that appears more fragile than usual fatigue fracture surface is observed.

ODAs around the inclusion (refer to FIG. 1) are observed in a test specimen fractured at long life by a low stress fracture test but is not observed in a test specimen fractured at a short life by a high stress fracture test. It is supposed from the foregoings that the ODAs were caused as a result of discontinuous development of cracks by the mechanism similar with delayed fracture by hydrogen trapped to the periphery of the intrusion and the repetitive stresses.

Then, the following test was conducted in order to investigate a relation between the dimension of the ODA and the hydrogen content. That is, a heat treatment (quenching) for the test specimen was conducted in a hydrogen-containing atmosphere (for example, in Rx gas) or in vacuum, and a fatigue test was conducted for each of the test specimens. When the fracture starting points of the test specimens fractured at about an identical fracture life were observed, the dimension of the ODA present at the periphery of the inclusion as the fracture starting point was considerably smaller in the specimen applied with quenching after heating in vacuum than in the test specimen applied with quenching after heating in the hydrogen-containing atmosphere. From the result described above, it has been found that a correlation exists between the dimension of the ODA and the hydrogen content.

The present inventors have already proposed an estimated equation for estimating the fatigue limit depending on the dimension of the non-metallic inclusion in order to evaluate the effect of the dimension of the non-metallic inclusion (defect) on the fatigue strength (Metal fatigue: Micro-defect and Inclusion, 1993, Yokendo), and it is possible to forecast the fatigue strength of a member according to the estimated equation. The estimated equation uses the dimension of the non-metallic inclusion, that is, the square root for the area of the non-metallic inclusion (hereinafter referred to as $\sqrt{area}$) as a parameter.

The present inventors have found that the fatigue fracture occurs when the dimension of the non-metallic inclusion ($\sqrt{area}$) and the dimension of the sum for the non-metallic inclusion and the ODA (square root of the sum for the area of the non-metallic inclusion and the area of the ODA; hereinafter referred to as $\sqrt{area'}$) exceed the limit value defined by the estimated equation.

In other words, they have found that a longer life can be expected when the dimension for the sum of the non-metallic inclusion and the ODA ($\sqrt{area'}$) is made smaller by the reduction of hydrogen content. As the measure for indicating the dimension of the non-metallic inclusion and ODA, ($\sqrt{area'}$)/($\sqrt{area}$) is used preferably.

In addition, the present inventors have found that there is a tendency that the dimension of the ODA is larger (that is, the value: ($\sqrt{area'}$)/($\sqrt{area}$) is larger) as the fatigue life is longer in a case where the hydrogen content exceeds 0.04 ppm. That is, the fatigue fracture occurs when the value of ($\sqrt{area'}$)/($\sqrt{area}$) is larger. From the foregoings, for longer life, it is desirable that the value of ($\sqrt{area'}$)/($\sqrt{area}$) at the repetitive number of cycles: $N=5.0 \times 10^7$ is 1.5 or less.

Further, the restriction on the hydrogen content described above is particularly effective in a case where the carbon content in the steel constituting the machine part undergoing the repetitive stresses is 0.2% or more and the hardness is Hv 450 or more.

That is, the dimension of the ODA can be decreased when the carbon content is 0.2% or more, the hardness is Hv 450 or more and, further, the hydrogen content is 0.04 ppm or less in the steel constituting the machine parts undergoing the repetitive stresses.

Accordingly, they undergo fatigue below the limit value for the estimated value of the fatigue limit calculated by the estimated equation in view of the dimension of the defect (non-metallic inclusion) and longer life can be attained. Also, when the dimension of the non-metallic inclusion is restricted in the step of designing the machine part, the fatigue limit of the machine part can be estimated at long life and a machine part of high reliability excellent in the super long life fatigue characteristic can be expected.

Then, it is possible to forecast, in the stage of design, those adaptable to various machine parts such as gears, bearings, turbines and axles to be used frequently while undergoing repetitive stresses over $10^7$ cycles by rotations and vibrations.

The machine parts in accordance with the invention means those parts constituting equipments such as prime movers and operation machines that convert the energy supplied from outside to specified useful jobs. For example, they mean axles of vehicles such as bullet trains, gears, turbines, and pumps. In addition, they can be applied to outer rings, inner rings, and cages constituting rolling bearings, as well as rolling elements constituting rolling devices such as linear guide bearings and ball screws.

BEST MODE FOR EMBODYING THE INVENTION

An embodiment of a machine part according to this invention will be described with reference to the drawings. This embodiment shows an example of this invention, and the invention is not limited to the embodiment.

Various test specimens were manufactured, and the results of conducting a fatigue test will be described.

Figure 2:
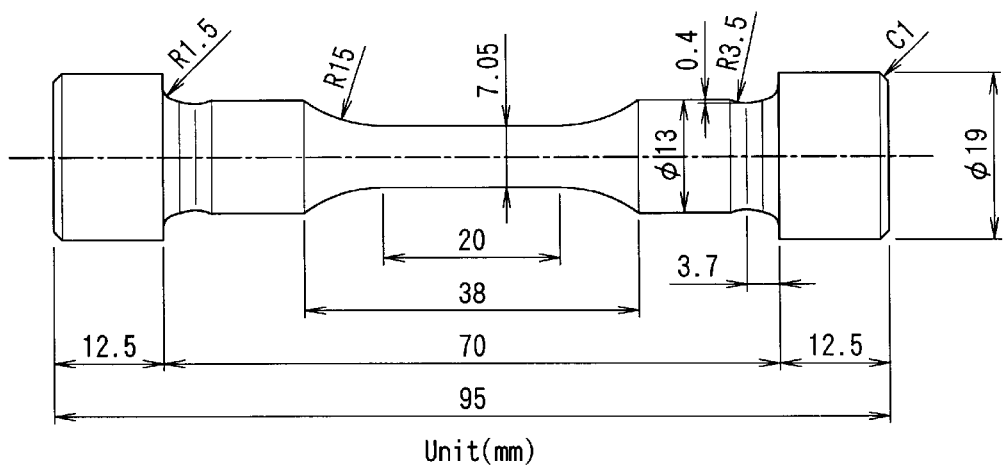
FIG. 2 is a view for explaining the shape and the dimension of a test specimen used in a fatigue test.

As the steel materials for the test specimens, SUJ2 (carbon content: 0.97%), SCM435 (carbon content: 0.35%), and SCR420 (carbon content: 0.2%) were used, and test specimens of the shape and dimension as shown in FIG. 2 were manufactured.

The heat treatment on the test specimens was conducted under the conditions of applying quenching at 840° C. for 30 min and then applying tempering at 180° C. for 120 min. In this case, the test specimens were manufactured while varying the hydrogen content by conducting heating in a hydrogen-containing atmosphere (Rx gas containing about 30% hydrogen) or in vacuum and then applying quenching. Then, the effect of the hydrogen content on the fatigue characteristic was examined. In the description to follow, the heat treatment of applying heating in the hydrogen-containing atmosphere is referred to as QT heat treatment and the heat treatment of applying heating in vacuum is referred to as VQ heat treatment.

However, heating may be conducted in a gas not containing hydrogen (for example, an inert gas such as nitrogen) instead of conducting heating in vacuum for keeping the hydrogen content low in the test specimen. Further, similar effect can be obtained also by applying tempering at a slightly higher temperature after usual quenching.

The test specimens applied with the heat treatment were surface-finished to #2000 by polishing using Emery paper. Then, after measuring the hydrogen content in the steels, they were put to a fatigue test.

The hydrogen content in the steels (machine parts after hardening by heat treatment) was measured by a temperature elevating hydrogen analysis method. The measuring method for the hydrogen content by the temperature elevating hydrogen analysis method is to be detailed below.

A specimen was inserted in a glass tube and the temperature was elevated at a temperature elevation rate of 15° C./min by using an infrared ray image furnace for heating with infrared rays from the outside. Then, hydrogen released from the test specimen in a temperate range from a room temperature to 800° C. was introduced to a mass spectrometer (MASSMATE 200, manufactured by Nippon Shinku Gijutsu Co.) to measure the amount of hydrogen. The temperature was measured by contacting thermocouples with the test specimen.

In the mass spectrometer, the hydrogen gas released in vacuum is ionized in a mass spectrometer tube. The ionization intensity is converted to a hydrogen releasing rate based on the ionization intensity of a calibrated standard leak. The hydrogen concentration is determined by integrating the hydrogen releasing rate. The profile of the hydrogen releasing rate was compared between a material charged with hydrogen and a material not charged with hydrogen to decide whether hydrogen was released or not and, further, positions stabilized at the lowest levels before and after thereof were connected to determine as the background.

The fatigue test is a tensile and compression fatigue test with a stress ratio of R=−1 (meaning that the tensile stress is equal with the compressive stress) and at a repeating rate of 35–42 Hz. In the tensile and compressive fatigue test, a slightly lower fatigue strength tends to be obtained when a bending stress exerts on the test specimen. Accordingly, strain gages are attached at positions for equally dividing the circumference into four portions near a grip part of the test specimen and the test specimen was attached to a fatigue tester with a careful adjustment so as not to exert the bending stress on the tested part upon loading of a stress. However, similar effects can also be obtained qualitatively even when bending stresses or shearing stresses are applied repetitively.

The maximum contact pressure determined based on the sum for the permanent deformation amount of a bearing ring and a rolling element of a rolling bearing (0.0001 times of the diameter of rolling element) is 3.92 GPa (400 kgf/mm$^2$). They are used actually in a state where 2.94 GPz (300 kgf/mm$^2$) of stresses are loaded repetitively (refer, for example, to Japanese Published Unexamined Patent Application No. 61372/1996).

Application of this invention excellent in the super long life fatigue characteristics to machine parts loaded with such large stresses repetitively is effective for the improvement of the fatigue life and the improvement of the reliability of the machine part.

The fracture surface of the test specimen fractured in the fatigue test was observed by a scanning electron microscope (JSM-T 220A, manufactured by Nippon Electron Co. Ltd.), to examine the dimension of a non-metallic inclusion which is the starting point of fracture ($\sqrt{\text{area}}$), and the dimension of a portion of the sum for the non-metallic inclusion and the ODA at the periphery thereof ($\sqrt{\text{area}}'$). Then, the value: ($\sqrt{\text{area}}'$)/($\sqrt{\text{area}}$) was determined.

Figure 1:
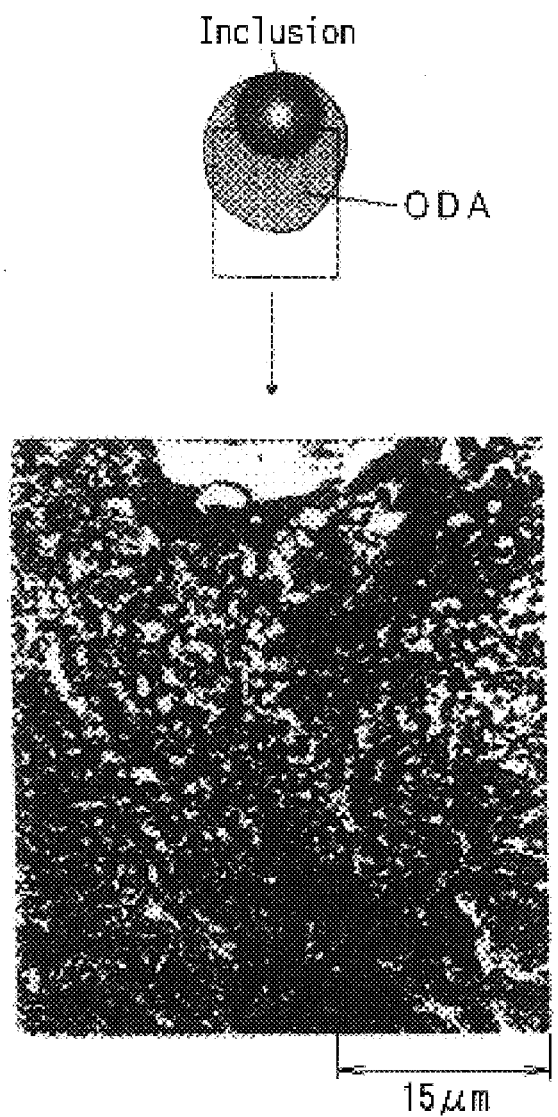
FIG. 1 is a view illustrating an SEM photograph observing a fracture surface of a test specimen suffering from super long life fatigue fracture.

That is, projection areas of the non-metallic inclusion and the ODA were determined by utilizing the difference of contrast (refer to FIG. 1) from two-dimensional scan images of SEM, and the value: ($\sqrt{\text{area}}'$)/($\sqrt{\text{area}}$) was calculated.

The results are shown in Tables 1 and 2. Each table shows, species of steels for test specimens, content of hydrogen, hardness Hv, repetitive stresses loaded in the fatigue test, repetitive number of cycles until fracture in the fatigue test, dimension of non-metallic inclusion ($\sqrt{\text{area}}$) by SEM observation, and value: ($\sqrt{\text{area}}'$)/($\sqrt{\text{area}}$) (dimension ratio), successively from the left of the table.

Further, all of the test specimens in examples were applied with VQ heat treatment, the test specimens of Comparative Examples 1–4 were applied with VQ heat treatment, and for the rest of the examples, QT heat treatment was applied.

TABLE 1

|  | Steel species | Hydrogen amount ppm | Hardness Hv | Stress MPa | Number of Repetition | Dimension of inclusion[1] | Dimensional ratio[2] |
|---|---|---|---|---|---|---|---|
| Example 1 | SCM435 | 0.01 | 561 | 702 | $5.83 \times 10^6$ | 35.4 | 1.21 |
| Example 2 | SCM435 | 0.01 | 561 | 600 | $1.43 \times 10^7$ | 55.6 | 1.18 |
| Example 3 | SCM435 | 0.01 | 561 | 540 | $4.80 \times 10^8$ | 22.3 | 1.39 |
| Example 4 | SCM435 | 0.01 | 561 | 640 | $5.30 \times 10^7$ | 22.3 | 1.39 |
| Example 5 | SCR420 | 0.04 | 450 | 710 | $1.02 \times 10^6$ | 29.6 | 1.12 |
| Example 6 | SCR420 | 0.04 | 450 | 600 | $8.84 \times 10^7$ | 24.0 | 1.52 |
| Example 7 | SCR420 | 0.04 | 450 | 540 | $9.01 \times 10^7$ | 18.7 | 1.33 |
| Comp. Example 1 | SUJ2 | 0.07 | 700 | 855 | $2.38 \times 10^5$ | 82.0 | 1.02 |
| Comp. Example 2 | SUJ2 | 0.07 | 700 | 857 | $3.25 \times 10^6$ | 23.4 | 1.78 |
| Comp. Example 3 | SUJ2 | 0.07 | 700 | 819 | $5.23 \times 10^6$ | 44.3 | 1.40 |
| Comp. Example 4 | SUJ2 | 0.07 | 700 | 799 | $4.55 \times 10^7$ | 23.9 | 2.05 |

[1] $\sqrt{\text{area}}$ (unit: μm)
[2] ($\sqrt{\text{area}}'$)/($\sqrt{\text{area}}$)

TABLE 2

|  | Steel species | Hydrogen amount ppm | Hardness Hv | Stress MPa | Number of Repetition | Dimension of inclusion[1] | Dimensional ratio[2] |
|---|---|---|---|---|---|---|---|
| Comp. Example 5 | SUJ2 | 0.8 | 700 | 884 | $4.50 \times 10^5$ | 72.3 | 1.22 |
| Comp. Example 6 | SUJ2 | 0.8 | 700 | 853 | $6.98 \times 10^6$ | 23.7 | 2.15 |
| Comp. Example 7 | SUJ2 | 0.8 | 700 | 831 | $2.65 \times 10^7$ | 21.3 | 2.20 |
| Comp. Example 8 | SUJ2 | 0.8 | 700 | 763 | $4.41 \times 10^7$ | 32.3 | 2.48 |
| Comp. Example 9 | SUJ2 | 0.8 | 700 | 840 | $5.40 \times 10^7$ | 18.0 | 2.70 |
| Comp. Example 10 | SCM435 | 0.8 | 561 | 821 | $1.11 \times 10^6$ | 22.2 | 1.37 |
| Comp. Example 11 | SCM435 | 0.8 | 561 | 781 | $6.54 \times 10^6$ | 18.7 | 1.78 |

TABLE 2-continued

|  | Steel species | Hydrogen amount ppm | Hardness Hv | Stress MPa | Number of Repetition | Dimension of inclusion[1] | Dimensional ratio[2] |
|---|---|---|---|---|---|---|---|
| Comp. Example 12 | SCM435 | 0.8 | 561 | 641 | $3.44 \times 10^7$ | 20.4 | 2.40 |
| Comp. Example 13 | SCM435 | 0.8 | 561 | 601 | $4.39 \times 10^7$ | 21.0 | 2.25 |
| Comp. Example 14 | SCM435 | 0.8 | 561 | 510 | $9.70 \times 10^7$ | 19.0 | 2.43 |
| Comp. Example 15 | SCR420 | 0.2 | 450 | 800 | $2.93 \times 10^6$ | 20.8 | 1.55 |
| Comp. Example 16 | SCR420 | 0.2 | 450 | 740 | $3.90 \times 10^7$ | 19.4 | 2.10 |
| Comp. Example 17 | SCR420 | 0.2 | 450 | 550 | $9.80 \times 10^7$ | 19.8 | 2.40 |

[1] $\sqrt{area}$ (unit: μm)
[2] $(\sqrt{area'})/(\sqrt{area})$

Figure 3:
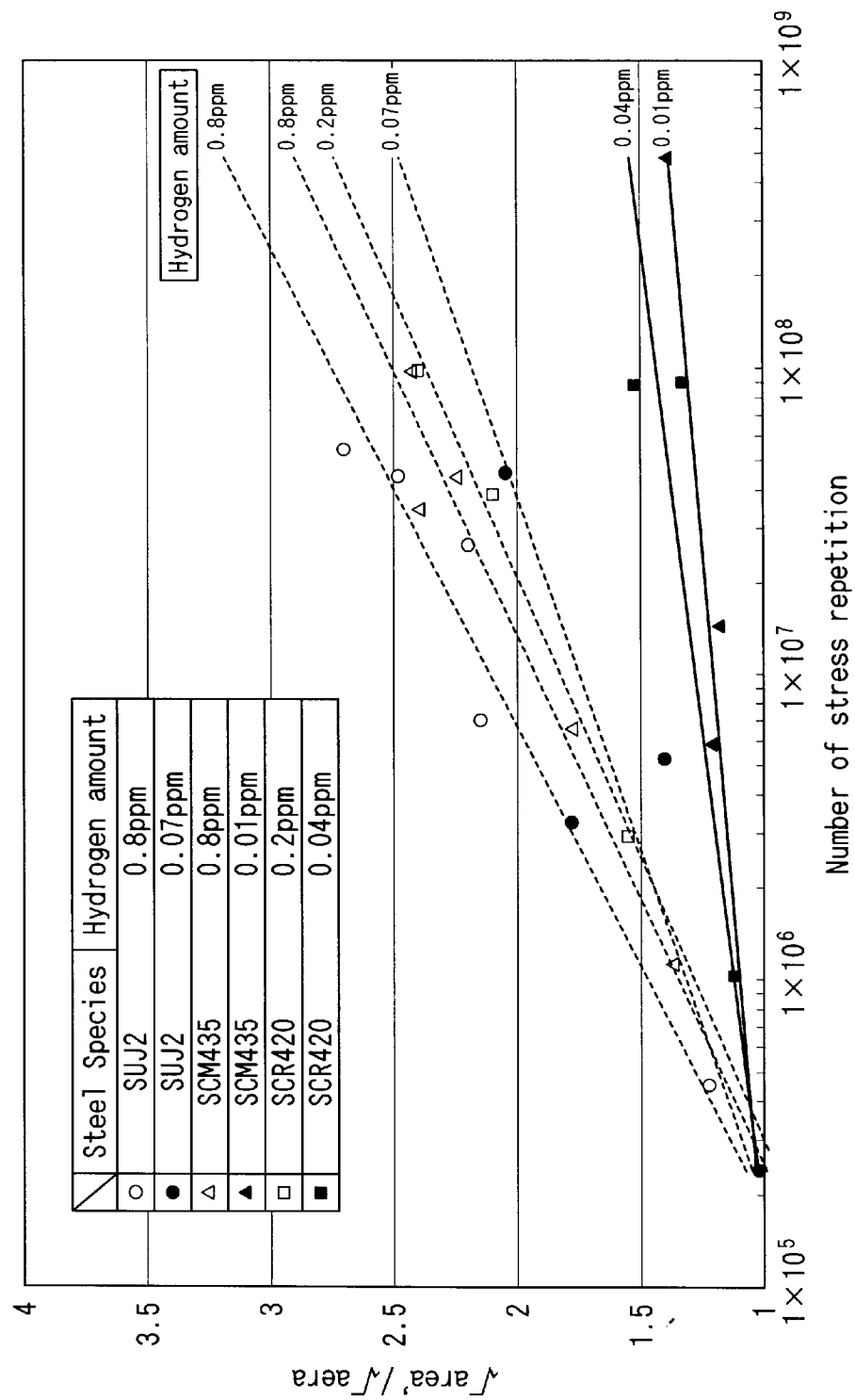
FIG. 3 is a graph illustrating a relation between the number of repetitive cycles and the value of ($\sqrt{area'}$)/($\sqrt{area}$) in the fatigue test.

Then, among the results described above, FIG. 3 shows a graph taking the value: $(\sqrt{area'})/(\sqrt{area})$ on the ordinate and the repetitive number on the abscissa.

As a result, it can be seen that, in the examples with the hydrogen content of 0.04 ppm or less, the dimension of the ODA is small (that is, the value: $(\sqrt{area'})/(\sqrt{area})$ is as small as 2.05 or less) even when the number of repetition N exceeds $10^7$ cycles and, the fatigue cracks due to hydrogen around the inclusion as the center less develop. On the other hand, in comparative examples with the hydrogen content in excess of 0.04 ppm, the value $(\sqrt{area'})/(\sqrt{area})$ exceeds 2.05 when the repetition number N exceeds $10^7$ cycles and it can be seen that the ODA increases by the development of fatigue cracks.

Since the fatigue strength is lower as the inclusion (defect) as the fracture starting point is larger, it is desirable that the dimension of the defect as the fracture starting point is smaller in order to attain the excellent super long life fatigue characteristic. As described above, when the hydrogen content is restricted to 0.04 ppm or less, since extension of the defect due to hydrogen is small (since the ODA less extends by the development of fatigue cracks), excellent super long life fatigue characteristic can be provided to the steel material.

Then, the hardness for each test specimen (carbon content) is noted and the result of the study on the relation with the super long life fatigue characteristic is to be described.

For the steel material of the test specimens, SUJ2 (carbon content: 0.97%), SCM435 (carbon content: 0.35%), SCR420 (carbon content: 0.2%) and SCM415 (carbon content: 0.15%) were used and the test specimens each of the shape and the dimension shown in FIG. 2 were manufactured.

The heat treatment for the test specimens were identical with the case described above, and test specimens with varied hydrogen content for each kind of the steel materials respectively (hydrogen content: 0.04, 0.08, 0.3 ppm) were manufactured by applying either the QT heat treatment or the VQ heat treatment.

When the hardness Hv was measured for each test specimen, the hardness Hv was higher as the carbon content was increased. That is, the hardness for the test specimen was Hv 720 for those made of SUJ2, Hv 560 for those made of SCM435, Hv 450 for those made of SCR420 and Hv 400 for those made of SCM415.

Successively, the same fatigue test as described above was conducted, and for the test specimens fractured at the repetition number N: $3 \times 10^7$–$5 \times 10^7$ cycles, the fracture surface was measured by SEM. Then, in the same manner as described above, the dimension ($\sqrt{area}$) for the non-metallic inclusion as the fracture starting point and the dimension ($\sqrt{area'}$) for the portion of the non-metallic inclusion and the ODA at the periphery thereof were examined. Then, the value: $(\sqrt{area'})/(\sqrt{area})$ was determined.

Figure 4:
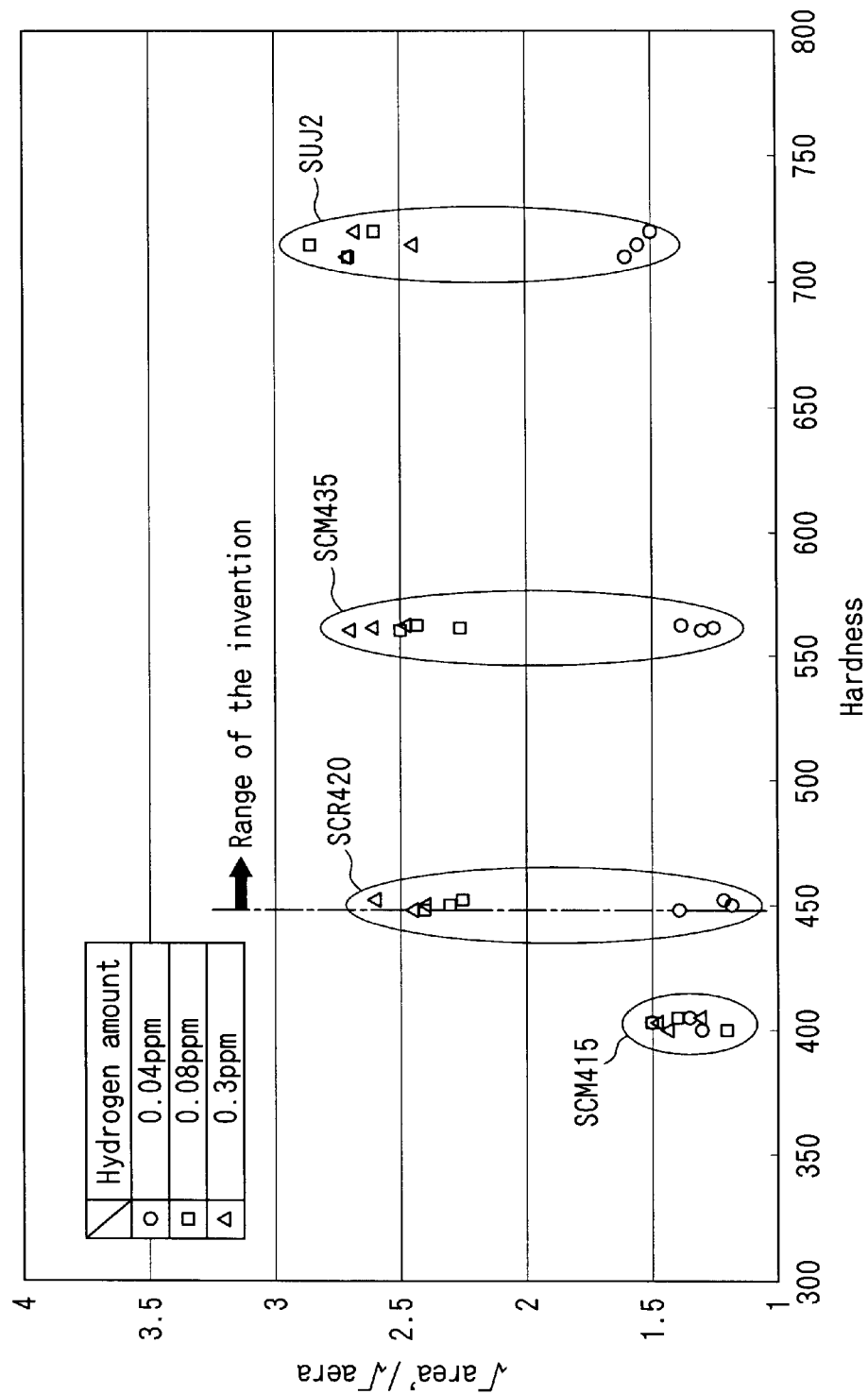
FIG. 4 is a graph illustrating a relation between the hardness Hv of a test specimen and the value of ($\sqrt{area'}$)/($\sqrt{area}$).

Among the results, FIG. 4 shows a graph taking the value: $(\sqrt{area'})/(\sqrt{area})$ on the ordinate and the hardness Hv on the abscissa.

As a result, the test specimens with the hydrogen content of 0.04 ppm or less can be expected for excellent super long life fatigue characteristic in which the dimension of the ODA is small (that is, the value: $(\sqrt{area'})/(\sqrt{area})$ is small) for any of the steel species (for any of hardness).

However, it can be seen, in the test specimens with the hydrogen content of 0.08 ppm or more, that the region regarded as the defect extends and it was difficult to expect for excellent super long life fatigue characteristic with the value: $(\sqrt{area'})/(\sqrt{area})$ being 2 or more, excepting for SCM415 with the hardness of Hv 400.

For the high strength steels it has been known so far that they tend to undergo the effect of hydrogen content more as the tensile strength is higher and show deterioration for the fatigue strength in a delayed fracture manner. Since a correlation exists between the tensile strength and the hardness, this may be attributable to that they undergo the effect of the hydrogen content more as the hardness is higher also in the case of this test specimen. Then, it was confirmed that the critical value is at Hv 450 in view of the graph shown in FIG. 4 and reduction of the hydrogen content is effective to the improvement of the super long life fatigue characteristics at Hv 450 or more.

In a case of SCM415 with the hardness of Hv 450 or lower, the value of $(\sqrt{area'})/(\sqrt{area})$ is not so large even when the hydrogen content exceeds 0.04 ppm (no correlation between the hydrogen content and the value of $(\sqrt{area'})/(\sqrt{area})$), and excellent super long life fatigue characteristic can be expected. Accordingly, in the invention of reducing the hydrogen content for improving the super long life fatigue characteristic, it is necessary that the steel hardness is Hv 450 or more.

Since the carbon content in the steel has to be 0.2% or more in order to obtain a hardness of Hv 450 or more, it is necessary that the carbon content in the steel is 0.2% or more in this invention.

As has been described above, since the steels with the hydrogen content of 0.04 ppm or less and the carbon content of 0.2% or more cause less hydrogen-induced extension of defects, it is excellent in the super long life fatigue characteristic. Accordingly, such steel materials can be applied suitably to machine parts that are used sometimes under repetitive stresses exceeding $10^7$ cycles by rotations or vibration.

Further, they are also applicable to outer rings, inner rings, rolling elements and cages constituting rolling bearings, as well as rolling members constituting rolling devices such as linear guide bearings and ball screws.

Industrial Applicability

As has been described above, since the machine part applied with this invention is excellent in the super long life fatigue characteristics, it is highly reliable.

What is claimed is:

1. A machine part made of steel having a carbon content of 0.2% or more and which has been hardened by heat treatment, in which the hydrogen content after hardening by heat treatment is 0.04 ppm or less.

2. A machine part as defined in claim 1, wherein the surface hardness after hardening by heat treatment is Hv 450 or more.

3. A machine part as defined in claim 1 or 2, which is used as a bearing ring or a rolling element of a rolling bearing.

* * * * *